United States Patent [19]

Kühn et al.

[11] Patent Number: 4,716,572
[45] Date of Patent: Dec. 29, 1987

[54] METHOD FOR COATING CARBON AND GRAPHITE BODIES

[75] Inventors: Heinrich Kühn, Brechen; Olaf Stitz, Frankfurt; Karl Wimmer, Nordendorf, all of Fed. Rep. of Germany

[73] Assignee: Sigri GmbH, Augsburg, Fed. Rep. of Germany

[21] Appl. No.: 810,313

[22] Filed: Dec. 17, 1985

[30] Foreign Application Priority Data

Dec. 19, 1984 [DE] Fed. Rep. of Germany ....... 3446286

[51] Int. Cl.$^4$ ................... H05B 7/094; B05D 1/02; B05D 5/12
[52] U.S. Cl. ............................. 373/88; 427/34; 427/78; 427/294; 427/299; 428/336; 428/688
[58] Field of Search ............ 427/34, 78, 294, 299; 428/336, 688; 373/88

[56] References Cited

U.S. PATENT DOCUMENTS

| | | | |
|---|---|---|---|
| Re. 30,883 | 3/1982 | Rau et al. | 427/34 |
| 3,275,471 | 9/1966 | Lowell et al. | 427/34 |
| 3,322,979 | 5/1967 | Clendinning et al. | 427/34 |
| 3,348,929 | 10/1967 | Daltschev et al. | 29/180 |
| 3,553,010 | 1/1971 | Rubisch | 427/34 |
| 4,003,770 | 1/1977 | Janowiccki et al. | 427/34 |
| 4,194,028 | 3/1980 | Sirte et al. | 427/249 |
| 4,288,495 | 9/1981 | Terner et al. | 427/34 |
| 4,449,286 | 5/1984 | Dahlberg | 427/34 |
| 4,450,184 | 5/1984 | Longo et al. | 427/34 |
| 4,508,788 | 4/1985 | Cheney | 427/34 |

FOREIGN PATENT DOCUMENTS 866818  5/1961  United Kingdom .

OTHER PUBLICATIONS

Grosewald et al., "Deposition of Silicon and Other Materials on Cathodes by Flame Spraying" in *IBM Technical Bulletin*, vol. 22, No. 5, Oct. 1979.

*Primary Examiner*—Janyce A. Bell
*Attorney, Agent, or Firm*—Herbert L. Lerner; Laurence A. Greenberg

[57] ABSTRACT

Coating graphite and carbon bodies with a protective layer containing predominantly silicon, by plasma spraying a silicon powder with a grain size under 0.05 mm and with an argon/hydrogen mixture as the plasma gas at reduced atmospheric pressure of at most 200 h Ps. The layer thickness is 0.1 to 0.5 mm and has a density which is at least 95% of the theoretical density. The coated bodies, for instance, graphite electrodes have a lower burnoff rate than unprotected ones in an oxidizing or corrosive atmosphere.

12 Claims, No Drawings

METHOD FOR COATING CARBON AND GRAPHITE BODIES

BACKGROUND OF THE INVENTION

1. Field of the Invention

The invention relates to a method for applying a protective silicon-containing layer to the surface of carbon or graphite bodies by plasma spraying.

2. Description of the Prior Art

Several methods have become known for protection of carbon and graphite bodies, primarily against oxidation and erosion, in which the surface of the body is coated with oxidation and erosion-resistant substances. Coating means are ceramic and compounds of refractory metals and also metals if the application temperatures of the coated body are not too high or the protection is required only for a given temperature range or a coating is needed which conducts electric current. From the group of metallic coating means, primarily silicon and alloys consisting substantially of silicon such as ferrosilicon, are technically important. These coatings means exhibit a relatively high resistance against aggressive agents and can be converted into silicon carbide entirely or partially in the generation of the protective layer itself or by a thermal post-treatment. Silicon-coated carbon and graphite has, for instance, been proposed for crucibles and other metallurgical vessels, electrodes, heat exchangers, nuclear reactors, nozzles and heat shields.

The durability of the protective layer applied to the surface of carbon and graphite bodies is determined primarily by the adhesion of the layer which is often insufficient especially in the case of repeated fast temperature changes. A separation of the layer or the formation of cracks comes about, which largely cancels the protection against oxidizing fluids. Numerous processes have been proposed for preparing protective layers on carbon and graphite which meet the requirements and consists substantially of silicon. According to U.S. Pat. No. 3,275,471, carbon and graphite bodies are immersed in a slurry of fine silicon powder with the addition of silicon carbide, and the thus coated bodies are heated to produce a protective layer which consists of a silicon matrix and silicon carbide particles dispersed in the matrix. Protective layers prepared according to this method are comparatively porous and are accordingly permeable to fluids. The behaviour or layers which are generated by deposition of silicon from the vapor phase or by flame spraying is similar. It has been proposed to eliminate the porosity of the silicon layer applied by brushing or flame spraying on graphite bodies, by local fusing, i.e. melting the silicon (British Pat. No. 866,818). With this treatment, the adhesion of the layer is improved because part of the melted material penetrates into the pores of the graphite body, and silicon carbide is formed in a transition zone. It is also known in coating smaller graphite bodies to move the body along a capillary filled with melted liquid silicon, where the melt issuing from the capillary forms a thin film on the surface of the body. In another method, carbon and graphite bodies are provided with a protective silicon layer in contact with reactive gases such as chlorosilanes at a higher temperature (German DE-OS No. 27 39 258). The protective layers prepared by this method are not free of shortcomings; in particular, the adhesion and gas tightness meet the technical requirements only in part.

Finally, it is known to provide the surface of carbon and graphite bodies with a protective layer which consists substantially of silicon by plasma spraying (German DE-OS No. 1 671 065; German Pat. No. 1 271 007). The porosity of the protective layers prepared by plasma spraying is less than the porosity of other layers except for CVD (chemical vapor deposition) layers without the diffusion of oxidizing fluids being impeded sufficiently by the layer. For this coating method, the application of several layers, the melting of the protective layer or its sealing with vitreous substances is accordingly provided as means for the necessary reduction of the permeability.

SUMMARY OF THE INVENTION

It is accordingly an object of the invention to simplify and improve the methods for preparing protective layers on carbon and graphite bodies and generate a substantially gas-impervious protective layer consisting substantially of silicon which adheres firmly to the surface of the body.

With the foregoing and other objects in view, there is provided in accordance with the invention a method for applying a silicon-containing protective layer to the surface of a carbon or graphite body which comprises, plasma spraying a silicon powder having a grain size under 0.05 mm with an inert gas/hydrogen mixture as a plasma gas at an atmospheric pressure of at most 200 h Pa to generate a protective layer 0.1 to 0.5 mm thick on the surface of the body, with the generated protective layer having a density which is at least 95% of the theoretical density.

Other features which are considered as characteristic for the invention are set forth in the appended claims.

Although the invention is illustrated and described herein as embodied in a method for coating carbon and graphite bodies, it is nevertheless not intended to be limited to the details shown, since various modifications may be made therein without departing from the spirit of the invention and within the scope and range of equivalents of the claims.

The invention however, together with additional objects and advantages thereof will be best understood from the following description.

DESCRIPTION OF THE PREFERRED EMBODIMENTS

The problem of overcoming the difficulty in generating a substantially gas-impervious protective layer consisting substantially of silicon on carbon and graphite bodies, is solved by plasma spraying, using a silicon powder with a grain size below 0.05 mm and an inert gas/hydrogen mixture as the plasma gas at an atmospheric pressure of at most 200 h Pa on the surface of the carbon or graphite body to generate a layer 0.1 to 0.5 mm thick of substantially silicon, the density of which is at least 95% of the theoretical density.

The basis of the invention is the surprising effect that a layer prepared in accordance with the invention is impervious to fluids, adheres well to carbon or graphite bodies and protects the bodies effectively against the attack of corrosive substances. The protection is achieved in a single operation, and consequently multiple coatings, or at least partial melting of the layer or the application of special sealing compounds can be omitted. Another advantage is the small scatter in the quality of the layer and, correspondingly, a small scatter in its service life. The effects would seem to be based primarily on the fact that the silicon particles are not oxidized and reach a higher speed than with plasma spraying at normal pressure. Both factors favor the development of a more ductile protective layer which is anchored on the surface profile of the carbon or graphite. The grain size of the silicon powder used for the coating should not be more than 0.05 mm, because with grain sizes above this limit, the permeability of the layer increases and its adhesion decreases. Grain fractions with grain sizes of 0.02 to 0.04 mm are particularly favorable with respect to the uniformity of the layer development. The term "silicon powder" is understood to include pure silicon as well as technical silicon grades with a content of impurities, especially ferrosilicon grades and alloys rich in silicon, the preponderant part of which consists of silicon and produce, under the conditions in accordance with the invention, an impermeable, strongly adhering layer. Particularly desirable as plasma gas is a mixture of a noble gas and hydrogen; especially argon and hydrogen, the volume ratio is preferably 60 to 70% argon and 40 to 30% hydrogen. With this composition of plasma gas, oxide layers on the silicon particles are substantially reduced and the ductility required for the quality of the layer is set. The atmospheric pressure in the coating chamber should not exceed 200 h Pa, since the protective layer becomes permeable for fluids at higher pressure and also its adhesion is unsatisfactory. With decreasing atmospheric pressure in the coating chamber, the amount of technical means to obtain decreased atmospheric pressure is necessarily increased without a substantial change in the quality of the protective layer. We have found that an economical amount of technical means relative to the quality of the layer is obtained with pressures of 50 to 100 h Pa.

In preparing an impermeable protection of the surface of carbon and graphite bodies, silicon must be applied to the surface in a mean layer thickness of at least 0.1 mm. The relatively large layer thickness is necessary because of the surface profile which goes back to the porosity of the body and of the geometric arrangement between the surface and the plasma nozzle. With increasing layer thickness, the mechanical stresses formed in the layer as a result of temperature changes or gradients increase, since the coefficients of expansion of the protective layer and the carbon or graphite bodies are different. As a consequence, cracks are formed in the protective layer, through which oxygen and other harmful fluids penetrate the layer. The maximum layer thickness should therefore be at most 0.5 mm. Especially advantageous are protective layers with a mean thickness between 0.25 and 0.35 mm. The density of the layer should be at least 95% of the theoretical density. With a density above 95% of theoretical density, pores contained in the protective layer do not extend over the entire thickness of the layer and the residual porosity has no adverse effect on the operation of the coating. Under some circumstances it may be advantageous to change the composition while it is being generated, for instance, to have the base of the layer consist of pure silicon and its surface of a silicon alloy. Under certain conditions of application, such alloys can be more resistant than pure silicon which, on the other hand, adheres well to the carbon surface. Concentration gradients of silicon in the layer are generated by changes of the powder composition during the coating.

The method according to the application is suitable for coating carbon and graphite bodies of any shape, for instance, arc lamp carbons, graphite crucibles for the manufacture of semiconductors, block heat exchangers of graphite, etc. The method is particularly well suited for coating the sections of graphite electrodes for arc furnaces which are screwed together to form a continuous column. Because of the fast heating-up and cooling-down of the electrode, the coatings are subjected to particularly large thermal stresses and must withstand an aggressive (corrosive) atmosphere. The protective silicon layers applied on graphite electrodes by the method according to the invention are stable, do not separate from the electrode surface and shield the electrode against fluids. For coating carbon or graphite bodies, for instance, an electrode, the bodies optionally after roughing the surface to be coated, cleaning and preliminary degassing, are placed and stored in a coating chamber. The bodies and the plasma nozzle can be moved and rotated relative to each other. The chamber is then evacuated to about 1 Pa and flooded with argon, while the atmospheric pressure rises to at most 200 h Pa and preferably to 50 to 100 h Pa. At the same time the plasma arc is drawn. The arc voltage is about 68 V, and the plasma gas consists of an argon/hydrogen mixture with 60 to 70 volume percent argon and the remainder hydrogen. Silicon powder with a grain size less than 0.05 mm is blown into the plasma and is deposited on the carbon or graphite surface which is arranged at a distance of about 250 to 300 mm from the plasma nozzle. With a power of 60 kW and a plasma gas flow of about 50 l/min, the powder throughput is about 100 g/min. The coating performance can be adapted within wide limits to the technical requirements by the simultaneous use of several plasma nozzles.

The invention will be described with the aid of the following examples. Sections for a graphite electrode with a diameter of 500 mm were roughened by lathe machining and sand blasting, whereby a mean roughness depth of about 0.05 to 0.09 mm was generated. The sections were placed in a coating chamber and provided with a layer substantially consisting of silicon as follows: The distance between the plasma nozzle and the graphite body was always 270 mm.

The coated sections were tested by comparison as parts of graphite electrodes in an arc furnace with a maximum transformer power rating of 20 MVA. The electrodes are subjected to the attack of oxidizing gases, slag, etc. and the loss, called lateral burnoff, is about 40 to 50% of the total electrode consumption.

In the protective layer of example 3, cracks developed when the electrode column was heated up, and the oxygen which diffused-in and reacted with the carbon led to cavities between the protective layer and the graphite body.

| Example number | 1 | 2 | 3 | 4 | 5 | 6 |
| --- | --- | --- | --- | --- | --- | --- |
| Atmospheric pressure in the coating chamber h Pa | 50 | 100 | 100 | 100 | 200 | 500 |

-continued

| Example number | 1 | 2 | 3 | 4 | 5 | 6 |
|---|---|---|---|---|---|---|
| Spraying powder | pure silicon | pure silicon | technical silicon | ferro-silicon (80% Si) | technical silicon | technical silicon |
| Grain size mm | 0.02–0.04 | 0.02–0.04 | 0.05–0.10 | 0.03–0.05 | 0.02–0.04 | 0.02–0.04 |
| Plasma gas | 60% Ar 40% H | 70% Ar 30% H | 60% Ar 40% H | 60% Ar 40% H | 100% Ar | 60% Ar 40% H |
| Electric power kW | 57 | 57 | 80 | 70 | 60 | 60 |
| Arc voltage V | 65 | 68 | 68 | 70 | 60 | 68 |
| Powder throughput g/min | 95 | 95 | 130 | 120 | 100 | 100 |
| Layer thickness mm | 0.20 | 0.25 | 0.60 | 0.35 | 0.30 | 0.30 |
| Relative density | 0.98 | 0.98 | 0.95 | 0.96 | 0.92 | 0.95 |

| Example number | 1 | 2 | 3 | 4 | 5 | 6 |
|---|---|---|---|---|---|---|
| Relative protected length* | 1 | 1 | 0.8 | 1 | 0.7 | 0.8 |
| Relative lateral burnoff** | 0.6 | 0.6 | 0.8 | 0.6 | 0.9 | 0.8 |

*length of the electrode part below the furnace lid at equilibrium, which exhibits a firmly adhering protective layer;
**relative to the unprotected electrode The protective layers of examples 5 and 6 were permeable due to their porosity and the adhesion of the layers was comparatively poor.

The foregoing is a description corresponding, in substance, to German application No. P 34 46 286.4, dated Dec. 19, 1984, international priority of which is being claimed for the instant application and which is hereby made part of this application. Any material discrepancies between the foregoing specification and the specification of the aforementioned corresponding German application are to be resolved in favor of the latter.

There is claimed:

1. Method for applying a sole, silicon-containing protective layer to the surface of a carbon or graphite body, which layer is substantially impervious to fluids, adheres well to carbon or graphite bodies and protects the bodies against attack of corrosive substances, which comprises, plasma spraying a powder consisting essentially of a silicon powder having a grain size under 0.05 mm with an inert gas/hydrogen mixture as a plasma gas at an atmospheric pressure of at most 200 h Pa to generate a protective layer 0.1 to 0.5 mm thick on the surface of the body, with the generated protective layer having a density which is at least 95% of the theoretical density.

2. Method according to claim 1, wherein the grain size of the silicon powder is 0.02 to 0.04 mm.

3. Method according to claim 1, wherein the plasma gas is an argon/hydrogen mixture.

4. Method according to claim 2, wherein the plasma gas is a mixture of 60 to 70 volume percent argon and 40 to 30 volume percent hydrogen.

5. Method according to claim 1, wherein the atmospheric pressure is 50 to 100 h Pa.

6. Method according to claim 4, wherein the atmospheric pressure is 50 to 100 h Pa.

7. Method according to claim 1, wherein the protective layer thickness is 0.25 to 0.35 mm.

8. Method according to claim 6, wherein the protective layer thickness is 0.25 to 0.35 mm.

9. Method according to claim 1, wherein during generation of the protective layer, the powder composition is changed to produce a concentration gradient of silicon in the layer over its thickness.

10. Method according to claim 1, wherein the surface of the body is roughened prior to generating the protective layer.

11. Method according to claim 1, wherein the carbon or graphite body is a graphite electrode section for an arc furnace.

12. A graphite electrode section for an arc furnace, the surface of which section is coated solely with a silicon-containing protective layer which is substantially impervious to fluids, adheres well to graphite bodies and protects the bodies against attack of corrosive substances, said layer obtained by plasma spraying a powder consisting essentially of a silicon powder having a grain size under 0.05 mm with an inert gas/hydrogen mixture as a plasma gas at an atmospheric pressure of at most 200 h Pa to generate a protective layer 0.1 to 0.5 mm thick on the surface of the body, with the generated protective layer having a density which is at least 95% of the theoretical density.

* * * * *